(12) United States Patent
Tian et al.

(10) Patent No.: US 11,146,571 B2
(45) Date of Patent: Oct. 12, 2021

(54) DATA TRANSMISSION METHOD, APPARATUS, TERMINAL DEVICE, AND MEDIUM

(71) Applicant: PING AN TECHNOLOGY (SHENZHEN) CO., LTD., Guangdong (CN)

(72) Inventors: Zhengwei Tian, Shenzhen (CN); Chao Feng, Shenzhen (CN); Yan Xue, Shenzhen (CN)

(73) Assignee: PING AN TECHNOLOGY (SHENZHEN) CO., LTD., Shenzhen (CN)

( * ) Notice: Subject to any disclaimer, the term of this patent is extended or adjusted under 35 U.S.C. 154(b) by 418 days.

(21) Appl. No.: 16/088,807

(22) PCT Filed: Feb. 26, 2018

(86) PCT No.: PCT/CN2018/077247
§ 371 (c)(1),
(2) Date: Sep. 26, 2018

(87) PCT Pub. No.: WO2019/062007
PCT Pub. Date: Apr. 4, 2019

(65) Prior Publication Data
US 2020/0314110 A1  Oct. 1, 2020

(30) Foreign Application Priority Data

Sep. 26, 2017 (CN) .......................... 201710880095.4

(51) Int. Cl.
*H04L 29/06* (2006.01)
*G06F 16/901* (2019.01)
*G06Q 30/02* (2012.01)

(52) U.S. Cl.
CPC .......... *H04L 63/123* (2013.01); *G06F 16/901* (2019.01); *G06Q 30/0201* (2013.01); *H04L 63/08* (2013.01)

(58) Field of Classification Search
CPC ... G06F 16/901; G06Q 30/0201; H04L 63/08; H04L 63/123
See application file for complete search history.

(56) References Cited

U.S. PATENT DOCUMENTS

| 2007/0140167 A1* | 6/2007 | Jang ...................... H04W 72/10 370/329 |
| 2015/0120857 A1* | 4/2015 | Nagai ...................... H04L 67/42 709/213 |
| 2016/0292206 A1* | 10/2016 | Ruiz Velazquez .......................... G06F 16/2358 |

FOREIGN PATENT DOCUMENTS

| CN | 105430035 A | 3/2016 |
| CN | 106576339 A | 4/2017 |
| CN | 107087280 A | 8/2017 |

OTHER PUBLICATIONS

Written Opinion of the International Searching Authority for corresponding International Patent Application No. PCT/CN2018/077247 dated May 2, 2018.

* cited by examiner

Primary Examiner — Jeffrey C Pwu
Assistant Examiner — Thong P Truong
(74) Attorney, Agent, or Firm — Loza & Loza, LLP; Michael F. Fedrick

(57) ABSTRACT

A data transmission method, including: acquiring business data to be uploaded which arc sent from a plurality of organizations; respectively checking whether or not the business data to be uploaded arc complete; acquiring business identifiers carried in the business data to be uploaded from organizations whose data are reviewed to be complete; performing first grouping on the business data to be uploaded from the organizations whose data arc reviewed to be complete, in accordance with the business identifiers; determining data size of the business data to be uploaded and acquiring a data size of each group after the first grouping; performing second grouping on a grouping result of the first grouping; and uploading the business data to be uploaded from the organizations whose data are reviewed to be complete in accordance with a grouping result of the second grouping.

12 Claims, 6 Drawing Sheets

DATA TRANSMISSION METHOD, APPARATUS, TERMINAL DEVICE, AND MEDIUM

CROSS-REFERENCE TO RELATED APPLICATIONS

The present application is the U.S. national stage of International Patent Application No. PCT/CN2018/077247, filed on Feb. 26, 2018 and entitled DATA TRANSMISSION METHOD, APPARATUS, TERMINAL DEVICE, AND MEDIUM, which claims priority under 35 U.S.C. § 119 from Chinese Patent Application No. 201710880095.4, entitled "DATA TRANSMISSION METHOD AND TERMINAL DEVICE", filed on Sep. 26, 2017. The content of the foregoing applications is incorporated herein by reference in its entirety.

TECHNICAL FIELD

The present application relates to the technical field of data processing, and more particularly to a data transmission method and terminal device.

BACKGROUND

With the advancement of society and the development of science and technology, Internet technology has also developed rapidly. Especially after entering the Internet+ era, along with the rapid development of the businesses of the Internet companies, the requirements of each organizations are more and more complex and various, and the data need to be transmitted is getting bigger and bigger. Taken monthly certification of a system as an example, various organizations are required to upload data that need to be certified to the system. The existing data transmission mode adopts serial communication, that is, only after data transmission of one organization is finished, a next organization can upload the data. In case that a certain organization has a great quantity of transmission data, other organizations behind such organization can only wait in sequence, which results in poor efficiency of the data transmission, long certification period, and incapability of satisfying the business demands of the organizations.

Technical Problem

Embodiments of the present application provide a data transmission method and terminal device, which aims at solving the problem that the data transmission through the serial communication mode has poor data transmission efficiency.

Technical Solution

According to a first aspect of the embodiments of the present application, a data transmission method is provided, which comprises:

acquiring business data to be uploaded which are sent from a plurality of organizations;

respectively checking whether or not the business data to be uploaded from each of the organizations are of data integrity;

acquiring business identifiers carried in the business data to be uploaded from organizations whose data being determined to be of data integrity in the plurality of organizations;

performing first grouping on the business data to be uploaded from the organizations whose data being determined to be of data integrity in the plurality of organizations, in accordance with the acquired business identifiers of the organizations whose data being determined to be of data integrity in the plurality of organizations;

determining data size of the business data to be uploaded from the organizations whose data being determined to be of data integrity in the plurality of organizations;

acquiring a data size of each group after the first grouping, in accordance with the determined data size of the business data to be uploaded from the organizations whose data being determined to be of data integrity in the plurality of organizations;

performing second grouping on a grouping result of the first grouping, in accordance with the data size of each group after the first grouping and a preset set of data transmission size; and uploading the business data to be uploaded from the organizations whose data being determined to be of data integrity in the plurality of organizations, in accordance with a grouping result of the second grouping.

According to a second aspect of the embodiments of the present application, a data transmission apparatus is provided, which comprises:

a data acquisition unit, configured for acquiring business data to be uploaded which are sent from a plurality of organizations;

a data integrity check unit, configured for respectively checking whether or not the business data to be uploaded from each of the organizations are of data integrity;

an identifier acquisition unit, configured for acquiring business identifiers carried in the business data to be uploaded from organizations whose data being determined to be of data integrity in the plurality of organizations;

a first grouping unit, configured for performing first grouping on the business data to be uploaded from the organizations whose data being determined to be of data integrity in the plurality of organizations, in accordance with the acquired business identifiers of the organizations whose data being determined to be of data integrity in the plurality of organizations;

a size determination unit, configured for determining data size of the business data to be uploaded from the organizations whose data being determined to be of data integrity in the plurality of organizations;

a grouping data size determination unit, configured for acquiring a data size of each group after the first grouping, in accordance with the determined data size of the business data to be uploaded from the organizations whose data being determined to be of data integrity in the plurality of organizations;

a second grouping unit, configured for performing second grouping on a grouping result of the first grouping, in accordance with the data size of each group after the first grouping and a preset set of data transmission size; and a data uploading unit, configured for uploading the business data to be uploaded from the organizations whose data being determined to be of data integrity in the plurality of organizations, in accordance with a grouping result of the second grouping.

According to a third aspect of the embodiments of the present application, a data transmission terminal device is provided, which comprises: a memory, a processor, and a computer readable instruction stored in the memory and executable on the processor; wherein the following steps are realized when the computer readable instruction is executed by the processor:

acquiring business data to be uploaded which are sent from a plurality of organizations;

respectively checking whether or not the business data to be uploaded from each of the organizations are of data integrity;

acquiring business identifiers carried in the business data to be uploaded from organizations whose data being determined to be of data integrity in the plurality of organizations;

performing first grouping on the business data to be uploaded from the organizations whose data being determined to be of data integrity in the plurality of organizations, in accordance with the acquired business identifiers of the organizations whose data being determined to be of data integrity in the plurality of organizations;

determining data size of the business data to be uploaded from the organizations whose data being determined to be of data integrity in the plurality of organizations;

acquiring a data size of each group after the first grouping, in accordance with the determined data size of the business data to be uploaded from the organizations whose data being determined to be of data integrity in the plurality of organizations;

performing second grouping on a grouping result of the first grouping, in accordance with the data size of each group after the first grouping and a preset set of data transmission size; and uploading the business data to be uploaded from the organizations whose data being determined to be of data integrity in the plurality of organizations, in accordance with a grouping result of the second grouping.

According to a third aspect of the embodiments of the present application, a computer readable storage medium is provided. The computer readable storage medium storing a computer readable instruction, wherein the following steps are realized when the computer readable instruction is executed by at least one processor:

acquiring business data to be uploaded which are sent from a plurality of organizations;

respectively checking whether or not the business data to be uploaded from each of the organizations are of data integrity;

acquiring business identifiers carried in the business data to be uploaded from organizations whose data being determined to be of data integrity in the plurality of organizations;

performing first grouping on the business data to be uploaded from the organizations whose data being determined to be of data integrity in the plurality of organizations, in accordance with the acquired business identifiers of the organizations whose data being determined to be of data integrity in the plurality of organizations;

determining data size of the business data to be uploaded from the organizations whose data being determined to be of data integrity in the plurality of organizations;

acquiring a data size of each group after the first grouping, in accordance with the determined data size of the business data to be uploaded from the organizations whose data being determined to be of data integrity in the plurality of organizations;

performing second grouping on a grouping result of the first grouping, in accordance with the data size of each group after the first grouping and a preset set of data transmission size; and uploading the business data to be uploaded from the organizations whose data being determined to be of data integrity in the plurality of organizations, in accordance with a grouping result of the second grouping.

Beneficial Effect

In embodiments of the present application, by acquiring business data to be uploaded which are sent from a plurality of organizations, respectively checking whether or not the business data to be uploaded from each of the organizations are of data integrity, acquiring business identifiers carried in the business data to be uploaded from organizations whose data being determined to be of data integrity in the plurality of organizations, performing first grouping on the organizations whose data are reviewed to be complete according to the acquired business identifiers, then determining the sizes of the business data to be uploaded from the organizations whose data are reviewed to be complete, further determining the data size of each group after the first grouping, performing the second grouping on the grouping result of the first grouping according to the data size of each grouping after the first grouping and the preset set of data transmission size, and uploading, to the system, the business data to be uploaded from the organizations whose data being determined to be of data integrity in the plurality of organizations according to the grouping results of the second group, such that the data uploading can be rapidly accomplished, it is solved the problem that the existing serial transmission mode has poor efficiency in data transmission, and meanwhile the requirement on the data uploading is lowered due to the data grouping, which is adaptable to the practical application.

DETAILED DESCRIPTION OF THE EMBODIMENTS

In order to explain the technical solutions described in the present application, the following description will be made by way of specific embodiments.

Figure 1:
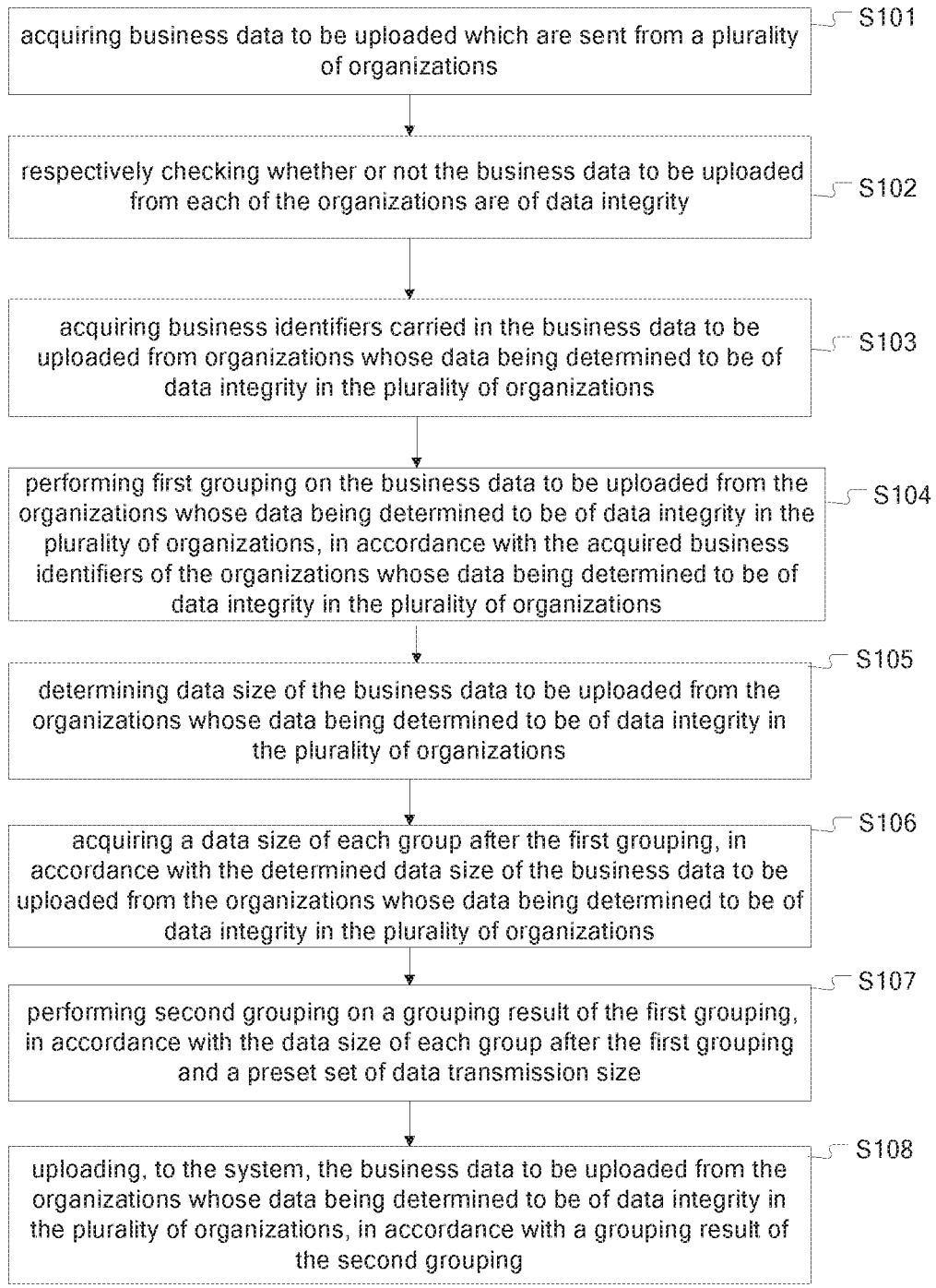
FIG. 1 is a schematic flowchart of a data transmission method according to an embodiment of the present application.

Referring to FIG. 1 which is a schematic flowchart of a data transmission method according to an embodiment of the present application, this embodiment is illustrated taken triggering at the angle of a terminal as an example, herein, the terminal may be a mobile terminal, such as a smartphone and a tablet. As shown in FIG. 1, in this embodiment, the processing procedure of the terminal may comprise the following steps:

S101, acquiring business data to be uploaded which are sent from a plurality of organizations;

Herein, before acquiring the business data to be uploaded sent from the plurality of organizations, the following step may be comprised: detecting whether or not connections to the plurality of organizations are normal, when the connections are detected to be normal, receiving the business data to be uploaded sent from the plurality of organizations, and when the connections are detected to be abnormal, stopping processing until the connections are detected to be normal, and then starting to receive the business data to be uploaded sent from the plurality of organizations. After acquiring the business data to be uploaded sent from the plurality of organizations, t the following step may be comprised: reviewing whether or not the business data to be uploaded sent from the plurality of organizations satisfy the requirement according to preset business data; and executing step 102 if it is reviewed that the business data to be uploaded sent from the plurality of organizations satisfy the requirement, or otherwise, re-sending a request for acquiring data to the organizations which are reviewed to fail in satisfying the requirement, and receiving the data re-sent from the organizations which are reviewed to not satisfy the requirement.

S102, respectively checking whether or not the business data to be uploaded from each of the organizations are of data integrity;

Specifically, the step of reviewing whether or not the business data to be uploaded are complete may be conducted according to the practical requirements, for example, reviewing whether or not the business data to be uploaded is non-null, and whether or not the length limitation and the format limitation are satisfied, etc. Herein, the step of reviewing whether or not the business data to be uploaded from the plurality of organizations are complete is that respectively checking whether or not the business data to be uploaded from each organization is complete, taken received data A sent from an organization A and data B sent from an organization B as an example, the step of reviewing whether or not the business data to be uploaded are complete is to review whether or not the data A sent from the organization A are complete and to review whether or not the data B sent from the organization B are complete.

S103, acquiring business identifiers carried in the business data to be uploaded from organizations whose data being determined to be of data integrity in the plurality of organizations. Specifically, the business identifier carried in the business data to be uploaded may be the business name, business label, and the like. For example, the business identifier carried in the business data to be uploaded by the organization A is a service 1, and the business identifier carried in the business data to be uploaded by the organization B is a service 2, etc.

S104, performing first grouping on the business data to be uploaded from the organizations whose data being determined to be of data integrity in the plurality of organizations, in accordance with the acquired business identifiers of the organizations whose data being determined to be of data integrity in the plurality of organizations.

Herein, after the business identifiers of the organizations whose data are reviewed to be complete are acquired, the various business identifiers can be classified, and the first grouping is performed on the business data to be uploaded from the organizations whose data are reviewed to be complete according to classification results. Taken organization A, organization B, organization C, and organization D, whose data are reviewed to be complete as an example, the business identifier carried in the business data to be uploaded from the organization A is business 1, the business identifier carried in the business data to be uploaded from the organization B is business 2, the business identifier carried in the business data to be uploaded from the organization C is business 1, and the business identifier carried in the business data to be uploaded from the organization D is business 4, the business identifiers of the above four organizations are classified, business 1 is a group, and business 2 is another group. According to the classification result, the business data to be uploaded from the organization A and the business data to be uploaded from the organization C are classified into the same group, while the business data to be uploaded from the organization B and the business data to be uploaded from the organization D are classified into the other group.

S105, determining data size of the business data to be uploaded from the organizations whose data being determined to be of data integrity in the plurality of organizations;

Specifically, after the sizes of the business data to be uploaded from the organizations whose data being determined to be of data integrity in the plurality of organizations are determined, the various data sizes are recorded, and the business data to be uploaded from the organizations whose data are reviewed to be complete are sorted according to the data sizes, which facilitates the subsequent data grouping.

S106, acquiring a data size of each group after the first grouping, in accordance with the determined data size of the business data to be uploaded from the organizations whose data being determined to be of data integrity in the plurality of organizations;

Herein, taken the organization A, the organization B, the organization C, and the organization D, whose data are reviewed to be complete as an example again, in step S105, the business data to be uploaded from the organization A, the organization B, the organization C, and the organization D are determined, for example, the business data to be uploaded from the organization A is 50 megabytes, the business data to be uploaded from the organization B is 30 megabytes, the business data to be uploaded from the organization C is 60 megabytes, and the business data to be uploaded from the organization D is 40 megabytes, if the first grouping results of the four organizations is as described in step S104, the business data to be uploaded from the organization A and the business data to be uploaded from the organization C are classified into the same group, and the data size of such group is 110 megabytes, while the business data to be uploaded from the organization B and the business data to be uploaded from the organization D are classified into the other group, and the data size of such group is 70 megabytes.

S107, performing second grouping on a grouping result of the first grouping, in accordance with the data size of each group after the first grouping and a preset set of data transmission size; and Specifically, the preset group of the data transmission size can be set according to practical circumstance, for example, a group of data transmission is preset to be 100 megabytes, taken the organization A, the organization B, the organization C, and the organization D as an example again, the business data to be uploaded from the organization A and the business data to be uploaded from the organization C are classified into the same group, and a data size of this group is 110 megabytes, while the business data to be uploaded from the organization B and the business data to be uploaded from the organization D are classified into the other group, and a data size of this group is 70 megabytes. Since the data size of the group including the business data to be uploaded from the organization A and the business data to be uploaded from the organization C exceeds 100 megabytes, the business data to be uploaded from the organization C and the business data to be uploaded from the organization B can be exchanged, that is, the data between different groups are exchanged for adjustment, after the adjustment, the business data to be uploaded from the organization A and the business data to be uploaded from the organization B are grouped into one group and the data size of this group is 80 megabytes, while the business data to be uploaded from the organization C and the business data to be uploaded from the organization D are grouped into the other group and the data size of such group is 100 megabytes. Since the data sizes of both groups do not exceed 100 megabytes and satisfy the requirement, the adjustment is stopped.

S108, uploading, to the system, the business data to be uploaded from the organizations whose data being determined to be of data integrity in the plurality of organizations, in accordance with a grouping result of the second grouping. Herein, the business data to be uploaded from the plurality of organizations are uploaded to the system by once according to the grouping result, such that the uploading efficiency is improved. Before uploading, to the system, the business data to be uploaded from the organizations whose data being determined to be of data integrity in the plurality of organizations, the following step may be further comprised: detecting whether or not the connection with the system is normal, when the connection is detected to be normal, uploading the business data to be uploaded from the organizations whose data being determined to be of data integrity in the plurality of organizations to the system in accordance with the grouping results of business data to be uploaded from the organizations whose data being determined to be of data integrity in the plurality of organizations, and when the connection is abnormal, stopping processing until the connection is detected to be normal again, and then starting to uploading the business data to be uploaded from the organizations to the system.

As can be seen from the above description, the data transmission method in the embodiment of the present application can achieve rapid data uploading and solves the problem that the data transmission through the existing serial communication has poor efficiency, and in the meanwhile, because of the data grouping, the requirement on the data uploading is lowered, which is adaptable to the practical application.

Figure 2:
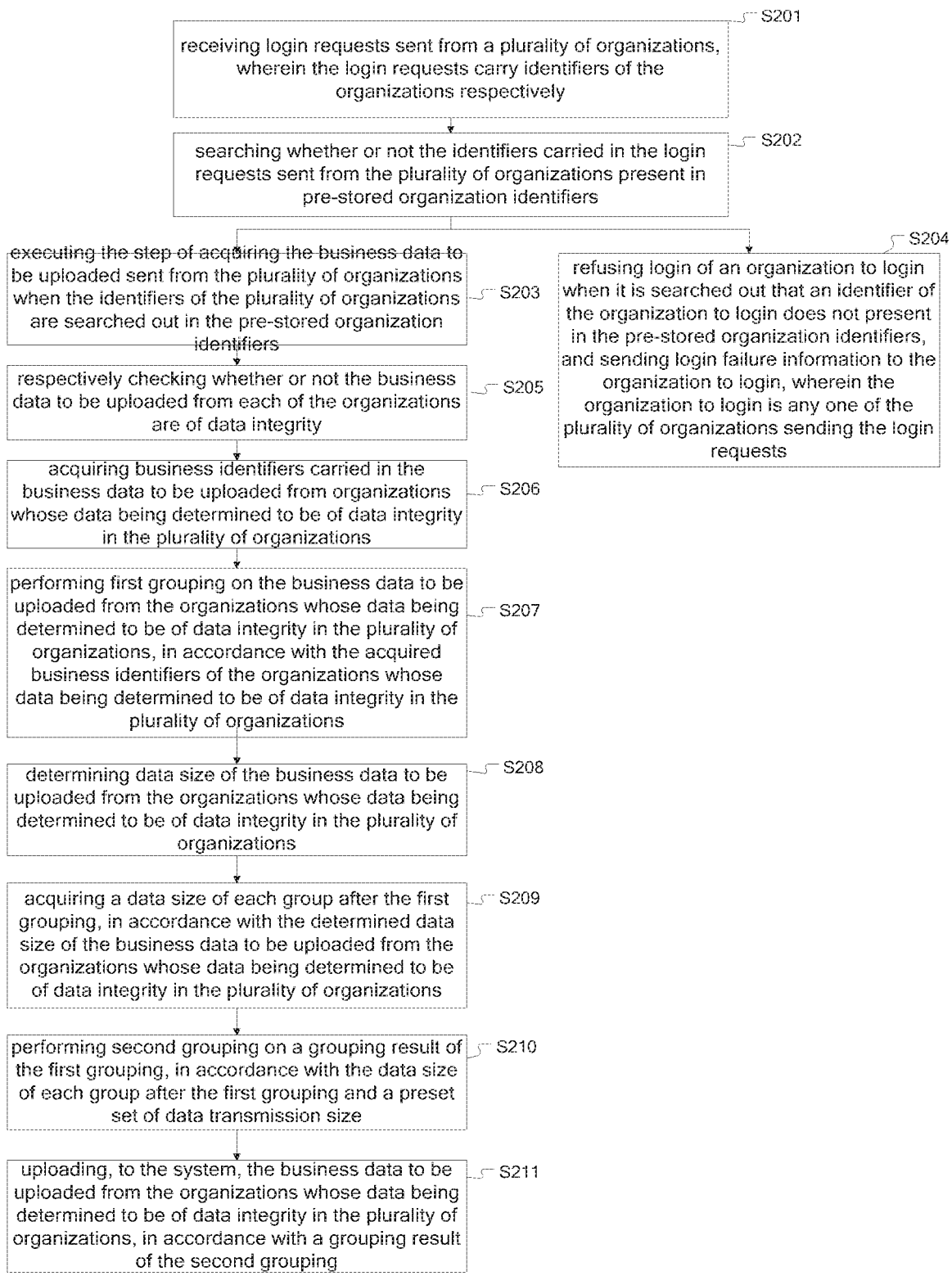
FIG. 2 is a schematic flowchart of a data transmission method according to another embodiment of the present application.

As shown in FIG. 2, which is a schematic flowchart of a data transmission method according to another embodiment of the present application. The present embodiment is different from the above embodiment in S201-S204, while S205-S211 are the same as S102-S108 of the above embodiment.

S201, receiving login requests sent from a plurality of organizations, wherein the login requests carry identifiers of the organizations respectively. Herein, the identifiers of the organizations can be set according to the practical requirements and can be organization name, organization identifier, and the like.

S202, searching whether or not the identifiers carried in the login requests sent from the plurality of organizations present in pre-stored organization identifiers. Specifically, the identifiers of the accessible organizations are pre-stored, and the search whether or not the identifiers of the above organizations present in the pre-stored organization identifiers is conducted.

S203, executing the step of acquiring the business data to be uploaded sent from the plurality of organizations when the identifiers of the plurality of organizations are searched out in the pre-stored organization identifiers. Herein, when the identifiers of the above organizations are searched out from the pre-stored organization identifiers, it means that these organizations are organizations that are permitted to access in, and after the access is completed, the business data to be uploaded from the plurality of organizations are acquired.

S204, refusing login of an organization to login when it is searched out that an identifier of the organization to login does not present in the pre-stored organization identifiers, and sending login failure information to the organization to login, wherein the organization to login is any one of the plurality of organizations sending the login requests. Specifically, when the identifiers of the above organizations are not searched out in the pre-stored organization identifiers, it means that these organizations are organizations not allowed to access in, the processing will be stopped, and the connection with such organization to login will be not established.

Figure 3:
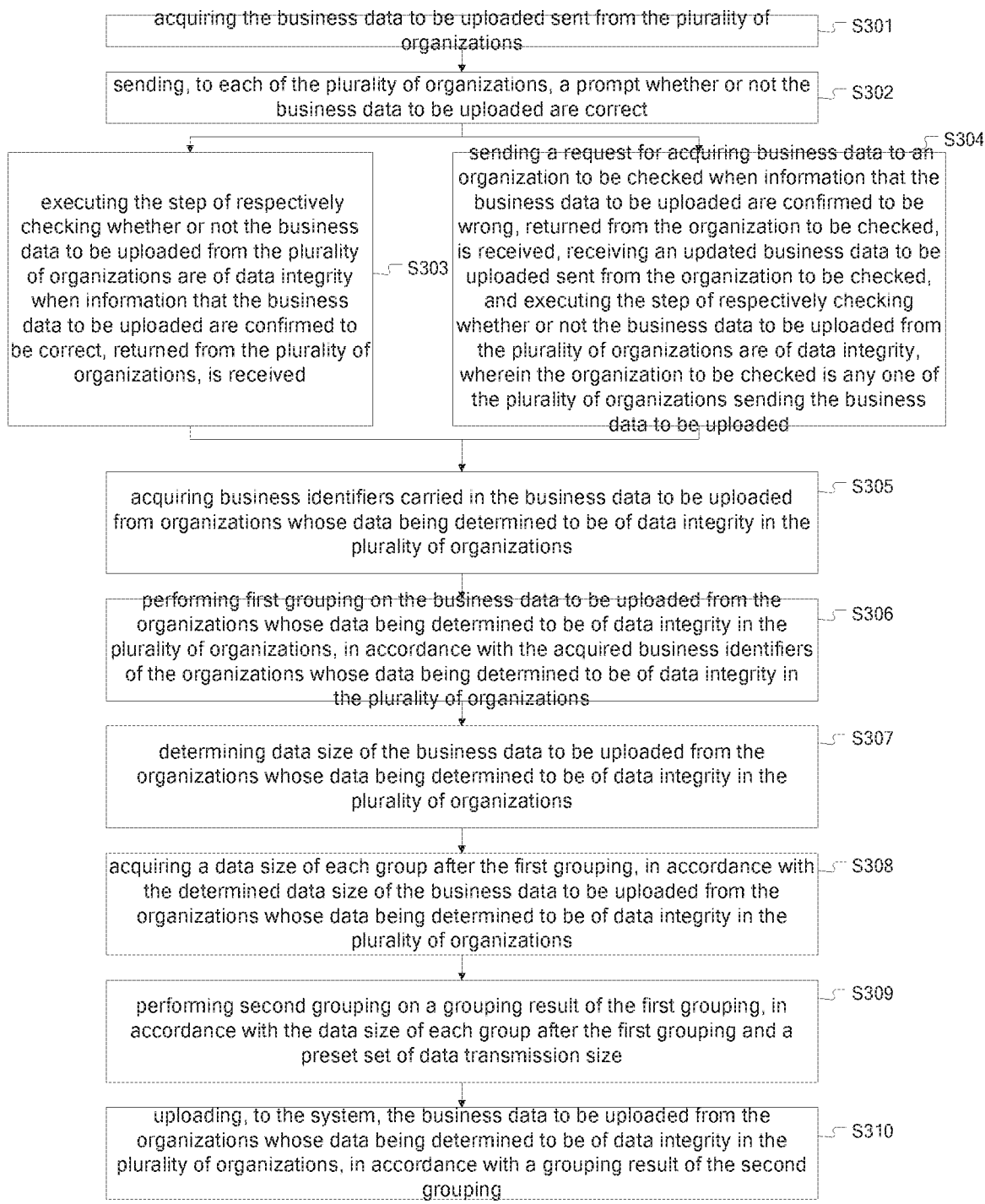
FIG. 3 is a schematic flowchart of a data transmission method according to still another embodiment of the present application.

As shown in FIG. 3, which is a schematic flowchart of a data transmission method according to still another embodiment of the present application. The differences between the present embodiment and the former embodiment lie in S301-S304, while S305-S310 are the same as S103-S108 of the former embodiment.

S301, acquiring the business data to be uploaded sent from the plurality of organizations;

S302, sending, to each of the plurality of organizations, a prompt whether or not the business data to be uploaded are correct. Herein, the prompt whether or not the business data to be uploaded are correct is sent to the plurality of organizations, and such prompt carries a corresponding business data to be uploaded, taken the organization A as an example, the prompt whether or not the business data to be uploaded are correct is sent to the organization A, and such prompt carries the business data to be uploaded sent from the organization A.

S303, executing the step of respectively checking whether or not the business data to be uploaded from the plurality of organizations are of data integrity when information that the business data to be uploaded are confirmed to be correct, returned from the plurality of organizations, is received. Specifically, after the information that the business data to be uploaded are confirmed to be correct are returned from the plurality of organizations and received, the step of respectively checking whether or not the business data to be uploaded from each of the organizations are of data integrity is conducted, so as to ensure the normal progress of the subsequent processing.

S304, sending a request for acquiring business data to an organization to be checked when information that the business data to be uploaded are confirmed to be wrong, returned from the organization to be checked, is received, receiving an updated business data to be uploaded sent from the organization to be checked, and executing the step of respectively checking whether or not the business data to be uploaded from the plurality of organizations are of data integrity, wherein the organization to be checked is any one of the plurality of organizations sending the business data to be uploaded. Herein, when the information that the business data to be uploaded are confirmed to be wrong is returned from the organization to be checked, the updated business data to be uploaded sent from the organization to be checked are received, and after it is received the updated business data to be uploaded re-sent from the organization having sent the information that the business data to be uploaded are confirmed to be wrong, whether or not the business data to be uploaded from the plurality of organizations are complete are respectively reviewed.

Figure 4:
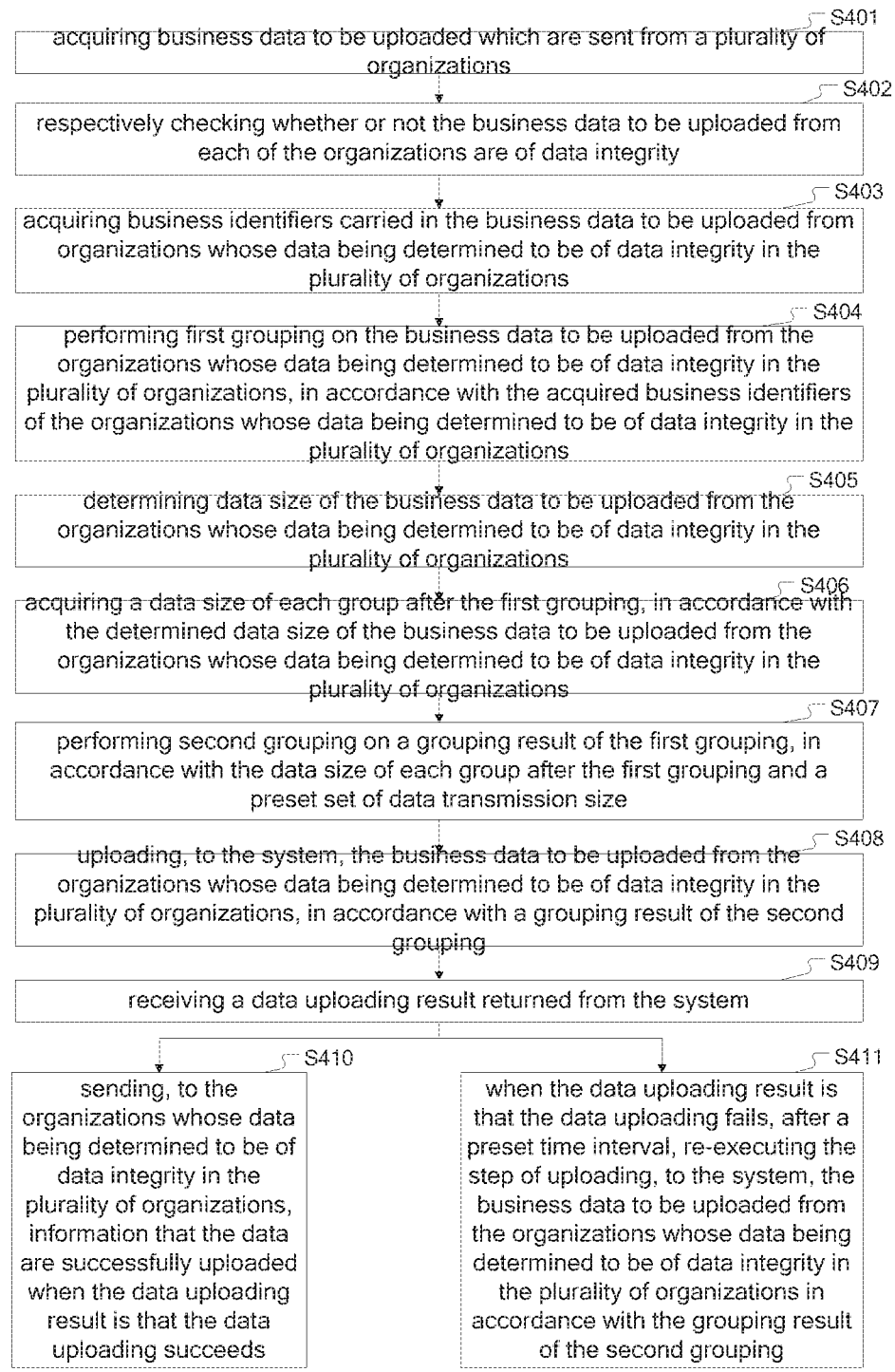
FIG. 4 is a schematic flow chart of a data transmission method according to still another embodiment of the present application.

As shown in FIG. 4, which is a schematic flowchart of a data transmission method according to still another embodiment of the present application. The differences between the present embodiment and the former embodiment lie in S409-S411, while S401-S408 are the same as S101-S108 of the former embodiment.

S409, receiving a data uploading result returned from the system; S410, sending, to the organizations whose data being determined to be of data integrity in the plurality of organizations, information that the data are successfully uploaded when the data uploading result is that the data uploading succeeds; and S411, when the data uploading result is that the data uploading fails, after a preset time interval, re-executing the step of uploading, to the system, the business data to be uploaded from the organizations whose data being determined to be of data integrity in the plurality of organizations in accordance with the grouping result of the second grouping.

Specifically, after the business data to be uploaded from the plurality of organizations are received by the system, the data uploading result returned from the system is received. When the data uploading result is that the data uploading succeeds, the information of successful uploading is sent to the plurality of organizations; or otherwise, the information of uploading failure is sent to the plurality of organizations, and after a preset time interval, the step of uploading, to the system, the business data to be uploaded from the organizations whose data being determined to be of data integrity in the plurality of organizations in accordance with the grouping result of the second grouping is re-executed, thus ensuring data re-sending and uploading to the system in the case that the data receiving of the system fails, satisfying requirements of multiple application occasions. Herein, the preset time interval is set according to requirement, and may be 5 seconds, 10 seconds, or the like.

Figure 5:
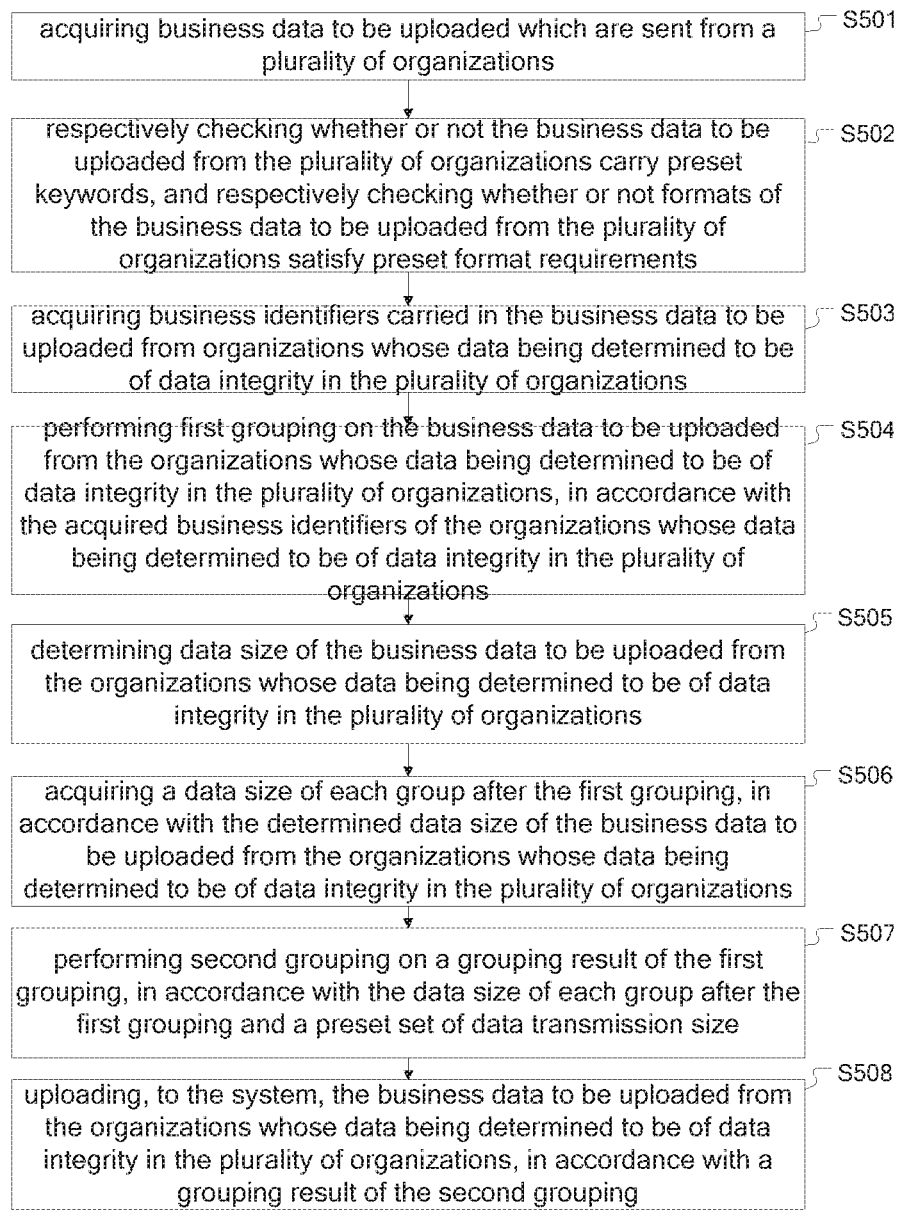
FIG. 5 is a schematic flowchart of a data transmission method according to sill another embodiment of the present application.

As shown in FIG. 5, which is a schematic flowchart of a data transmission method according to still another embodiment of the present application. The difference between the present embodiment and the embodiment corresponding to FIG. 1 lies in that the step of respectively checking whether or not the business data to be uploaded from each of the organizations are of data integrity may be by S502. Herein, S501 is the same as S101 of the former embodiment, and S503-S508 are the same as S103-S108 of the former embodiment.

S502, respectively checking whether or not the business data to be uploaded from the plurality of organizations carry preset keywords, and respectively checking whether or not formats of the business data to be uploaded from the plurality of organizations satisfy preset format requirements. Herein, keywords and format requirements may be preset according to practical requirements, it is verified whether or not the business data to be uploaded from the plurality of organizations carry the preset keywords and whether or not the formats of the business data to be uploaded from the plurality of organizations satisfy the preset format requirements, for example, the data uploaded from the plurality of organizations are used for the certification of the system, the set keywords comprise: identifiers, data names, and the like.

And the set format requirements comprise: the requirement that the uploaded data should carry name field and identifier field, and the like. If it is verified that the business data to be uploaded from the plurality of organizations carry preset keywords and that formats of the business data to be uploaded from the plurality of organizations satisfy preset format requirements, then the step of acquiring the business identifiers carried in the business data to be uploaded from the organizations whose data being determined to be of data integrity in the plurality of organizations is executed. Herein, by setting the keywords and the formats, it is verified whether or not the business data to be uploaded from the plurality of organizations satisfies the requirements on the subsequent systematic data processing, only after the pass of the verification, the subsequent processing is performed, such that the correctness and effectiveness of the subsequent data processing are ensured, thereby being adaptable to the application.

Figure 6:
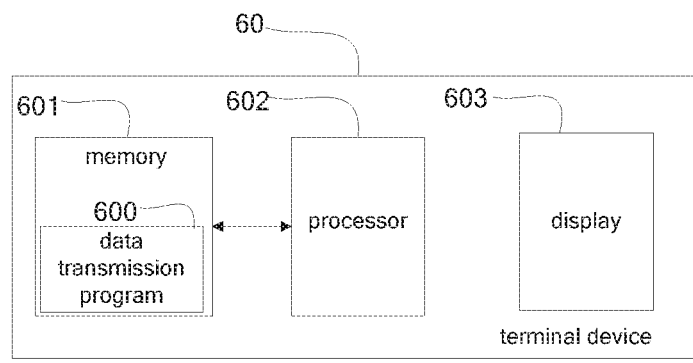
FIG. 6 is a schematic block diagram of a data transmission terminal device according to an embodiment of the present disclosure.

Corresponding to the data transmission method described in the embodiments as described above, FIG. 6 is a schematic diagram showing the operating environment of the data transmission program provided by the embodiment of the present application. For the convenience of explanation, only those parts related to the present embodiment are shown. In the embodiment, the data transmission program 600 is installed and runs in the terminal device 60. The terminal device 60 can be a mobile terminal, a palmtop computer, a server, or the like. The terminal device 60 may include, but is not limited to, a memory 601, a processor 602, and a display 603.

In some embodiments, the memory 601 may be an internal storage unit of the terminal device 60, such as a hard disk or a memory of the terminal device 60. In other embodiments, the memory 601 may also be an external storage device of the terminal device 60, such as a plug-in hard disk equipped on the terminal device 60, a smart memory card (SMC), a secure digital device. (Secure Digital, SD) card, and a flash card, etc. Further, the memory 601 may also include both an internal storage unit of the terminal device 60 and an external storage device. The memory 601 is configured to store application software and various types of data installed in the terminal device 60, such as program codes of the data transmission program 600. The memory 601 may also be used to temporarily store data that has been output or that is to be output.

In some embodiments, the processor 602 may be a central processing unit (CPU), a microprocessor, or other data processing chip, which is configured for running program code or processing data stored in the memory 601, for example, executing the data transfer program 600 and the like.

In some embodiments. the display 603 may be an LED display, a liquid crystal display, a touch-sensitive liquid crystal display, an OLED (Organic Light-Emitting Diode) touch sensor, or the like. The display 603 is used to display information processed in the terminal device 60 and a user interface for displaying visualizations, such as an application menu interface, an application icon interface, and the like. The components 601-603 of the terminal device 60 communicate with one another via a system bus.

Figure 7:
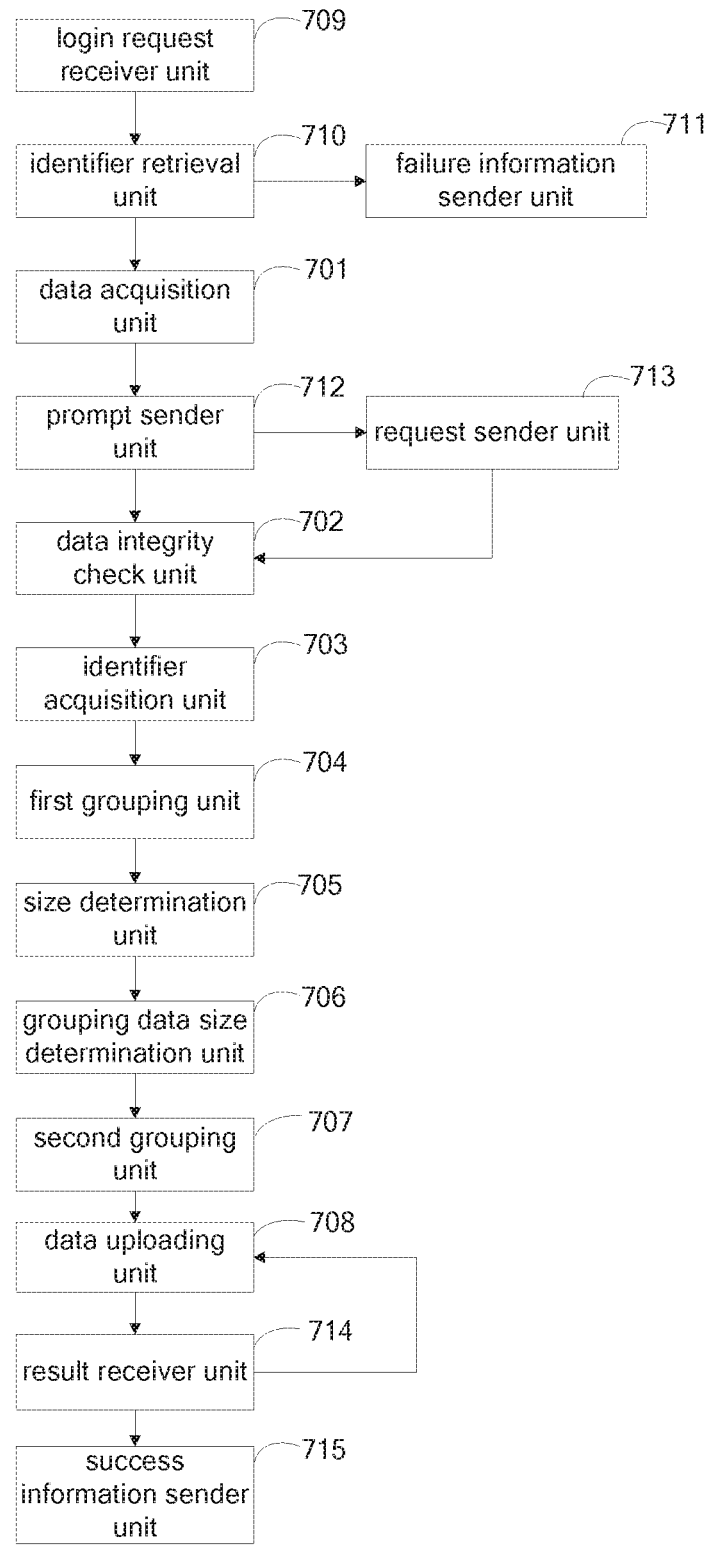
FIG. 7 is a schematic block diagram of a data transmission program according to an embodiment of the present application.

Referring to FIG. 7, which is a functional block diagram of a data transmission program 600 according to an embodiment of the present application. In this embodiment, the data transmission program 600 may be divided into a data acquisition unit 701, a data integrity check unit 702, an identifier acquisition unit 703, a first grouping unit 704, a size determination unit 705, a grouping data size determination unit 706, a second grouping unit 707, and a data uploading unit 708

Herein, the data acquisition unit 701 is configured for acquiring business data to be uploaded which are sent from a plurality of organizations. The data integrity check unit 702 is configured for respectively checking whether or not the business data to be uploaded from each of the organizations are of data integrity. The identifier acquisition unit 703 is configured for acquiring business identifiers carried in the business data to be uploaded from organizations whose data being determined to be of data integrity in the plurality of organizations. The first grouping unit 704 is configured for performing first grouping on the business data to be uploaded from the organizations whose data being determined to be of data integrity in the plurality of organizations, in accordance with the acquired business identifiers of the organizations whose data being determined to be of data integrity in the plurality of organizations. The size determination unit 705 is configured for determining data size of the business data to be uploaded from the organizations whose data being determined to be of data integrity in the plurality of organizations. The grouping data size determination unit 706 is configured for acquiring a data size of each group after the first grouping, in accordance with the determined data size of the business data to be uploaded from the organizations whose data being determined to be of data integrity in the plurality of organizations. The second grouping unit 707 is configured for performing second grouping on a grouping result of the first grouping, in accordance with the data size of each group after the first grouping and a preset set of data transmission size. The data uploading unit 708 is configured for uploading the business data to be uploaded from the organizations whose data being determined to be of data integrity in the plurality of organizations, in accordance with a grouping result of the second grouping.

Optionally, the data transmission program 600 may be further divided into a login request receiver unit 709, an identifier retrieval unit 710, and a failure information sender unit 711. Herein, the login request receiver unit 709 is configured for receiving login requests sent from a plurality of organizations, wherein the login requests carry identifiers of the organizations respectively. The identifier retrieval unit 710 is configured for searching whether or not the identifiers carried in the login requests sent from the plurality of organizations present in pre-stored organization identifiers. The data acquisition unit 701 is configured for executing the step of acquiring the business data to be uploaded sent from the plurality of organizations when the identifiers of the plurality of organizations are searched out in the pre-stored organization identifiers. The failure information sender unit 711 is configured for refusing login of an organization to login when it is searched out that an identifier of the organization to login does not present in the pre-stored organization identifiers, and sending login failure information to the organization to login, wherein the organization to login is any one of the plurality of organizations sending the login requests.

Optionally, the data transmission program 600 may be further divided into a prompt sender unit 712 and a request sender unit 713. Herein, the prompt sender unit 712 is configure for sending, to each of the plurality of organizations, a prompt whether or not the business data to be uploaded are correct. The data integrity check unit 702 is configured for executing the step of respectively checking whether or not the business data to be uploaded from the plurality of organizations are of data integrity when information that the business data to be uploaded are confirmed to be correct, returned from the plurality of organizations, is received. The request sender unit 713 is configured for sending a request for acquiring business data to an organization to be checked when information that the business data to be uploaded are confirmed to be wrong, returned from the organization to be checked, is received, receiving an updated business data to be uploaded sent from the organization to be checked, and the data integrity check unit 702, configured for executing the step of respectively checking whether or not the business data to be uploaded from the plurality of organizations are of data integrity, wherein the organization to be checked is any one of the plurality of organizations sending the business data to be uploaded.

Optionally, the data transmission program 600 may be further divided into a result receiver unit 714 and a success information sender unit 715. The result receiver unit 714 is configured for receiving a data uploading result returned from the system. The success information sender unit 715 is configured for sending, to the organizations whose data being determined to be of data integrity in the plurality of organizations, information that the data are successfully uploaded when the data uploading result is that the data uploading succeeds. The data uploading unit 708 is configured for, when the data uploading result is that the data uploading fails, after a preset time interval, re-executing the step of uploading, to the system, the business data to be uploaded from the organizations whose data being determined to be of data integrity in the plurality of organizations in accordance with the grouping result of the second grouping.

Optionally, the data integrity check unit 702 is configured for respectively checking whether or not the business data to be uploaded from the plurality of organizations carry preset keywords, and respectively checking whether or not formats of the business data to be uploaded from the plurality of organizations satisfy preset format requirements.

The integrated module/unit, if implemented in the form of a software functional unit and sold or used as an independent product, may be stored in a computer readable storage medium. Based on such understanding, the present application implements all or part of the processes in the method of the foregoing embodiment, and may also be implemented by commanding related hardware through computer readable instructions, which may be stored in a computer readable storage medium. The computer readable instructions, when executed by a processor, may implement the steps of the various method embodiments described above. The computer readable instructions include computer readable instruction code, which may be in the form of source code, in the form of object code, an executable file or some intermediate form or the like. The computer readable storage medium may include any entity or device capable of carrying the computer readable instruction code, a recording medium, a USB flash disk, a mobile hard disk, a magnetic disk, an optical disk, a computer memory, a read-only memory (ROM), random access memory (RAM), electrical carrier signals, telecommunications signals, software distribution media, etc. It should be noted that the content contained in the computer readable storage medium may be appropriately increased or decreased according to the requirements of legislation and patent practice in a jurisdiction. For example, in some jurisdictions, according to legislation and patent practice, the computer readable storage medium does not include electrical carrier signals and telecommunication signals.

What is claimed is:

1. A data transmission method, comprising:
   acquiring, by a computer, business data to be uploaded which are sent from a plurality of organizations;
   respectively checking, by the computer, whether or not the business data to be uploaded from each of the organizations are of data integrity;
   acquiring, by the computer, business identifiers carried in the business data to be uploaded from organizations whose data being determined to be of data integrity in the plurality of organizations;
   performing, by the computer, first grouping on the business data to be uploaded from the organizations whose data being determined to be of data integrity in the plurality of organizations, in accordance with the acquired business identifiers of the organizations whose data being determined to be of data integrity in the plurality of organizations;
   determining, by the computer, data size of the business data to be uploaded from the organizations whose data being determined to be of data integrity in the plurality of organizations;
   acquiring, by the computer, a data size of each group after the first grouping, in accordance with the determined data size of the business data to be uploaded from the organizations whose data being determined to be of data integrity in the plurality of organizations;
   performing, by the computer, a second grouping on a grouping result of the first grouping, in accordance with the data size of each group after the first grouping and a preset set of data transmission size;
   uploading, by the computer, the business data to be uploaded from the organizations whose data being determined to be of data integrity in the plurality of organizations, in accordance with a grouping result of the second grouping;
   sending, to each of the plurality of organizations, a prompt whether or not the business data to be uploaded are correct;
   executing the step of respectively checking whether or not the business data to be uploaded from the plurality of organizations are of data integrity when information that the business data to be uploaded are confirmed to be correct, returned from the plurality of organizations, is received; and
   sending a request for acquiring business data to an organization to be checked when information that the business data to be uploaded are confirmed to be wrong, returned from the organization to be checked, is received, receiving an updated business data to be uploaded sent from the organization to be checked, and executing the step of respectively checking whether or not the business data to be uploaded from the plurality of organizations are of data integrity, wherein the organization to be checked is any one of the plurality of organizations sending the business data to be uploaded.

2. The data transmission method of claim 1, wherein, the data transmission method further comprises:
   receiving login requests sent from a plurality of organizations, wherein the login requests carry identifiers of the organizations respectively;
   searching whether or not the identifiers carried in the login requests sent from the plurality of organizations present in pre-stored organization identifiers;
   executing the step of acquiring the business data to be uploaded sent from the plurality of organizations when the identifiers of the plurality of organizations are searched out in the pre-stored organization identifiers;
   refusing login of an organization to login when it is searched out that an identifier of the organization to login does not present in the pre-stored organization identifiers, and sending login failure information to the organization to login, wherein the organization to login is any one of the plurality of organizations sending the login requests.

3. The data transmission method of claim 1, wherein, the data transmission method further comprises:
   receiving a data uploading result returned from the system;
   sending, to the organizations whose data being determined to be of data integrity in the plurality of organizations, information that the data are successfully uploaded when the data uploading result is that the data uploading succeeds; and
   when the data uploading result is that the data uploading fails, after a preset time interval, re-executing the step of uploading, to the system, the business data to be uploaded from the organizations whose data being determined to be of data integrity in the plurality of organizations in accordance with the grouping result of the second grouping.

4. The data transmission method of claim 1, wherein the step of respectively checking whether or not the business data to be uploaded from each of the organizations are of data integrity comprises:
   respectively checking whether or not the business data to be uploaded from the plurality of organizations carry preset keywords, and respectively checking whether or not formats of the business data to be uploaded from the plurality of organizations satisfy preset format requirements.

5. A data transmission terminal device, comprising: a memory, a processor, and a computer readable instruction stored in the memory and executable on the processor; wherein the following steps are realized when the computer readable instruction is executed by the processor:
   acquiring business data to be uploaded which are sent from a plurality of organizations;
   respectively checking whether or not the business data to be uploaded from each of the organizations are of data integrity;
   acquiring business identifiers carried in the business data to be uploaded from organizations whose data being determined to be of data integrity in the plurality of organizations;
   performing first grouping on the business data to be uploaded from the organizations whose data being determined to be of data integrity in the plurality of organizations, in accordance with the acquired business identifiers of the organizations whose data being determined to be of data integrity in the plurality of organizations;
   determining data size of the business data to be uploaded from the organizations whose data being determined to be of data integrity in the plurality of organizations;
   acquiring a data size of each group after the first grouping, in accordance with the determined data size of the business data to be uploaded from the organizations whose data being determined to be of data integrity in the plurality of organizations;

performing second grouping on a grouping result of the first grouping, in accordance with the data size of each group after the first grouping and a preset set of data transmission size;

uploading the business data to be uploaded from the organizations whose data being determined to be of data integrity in the plurality of organizations, in accordance with a grouping result of the second grouping;

sending a prompt whether or not the business data to be uploaded are correct to the plurality of organizations;

executing the step of respectively checking whether or not the business data to be uploaded from the plurality of organizations are of data integrity when information that the business data to be uploaded are confirmed to be correct, returned from the plurality of organizations, is received; and sending a request for acquiring business data to an organization to be checked when information that the business data to be uploaded are confirmed to be wrong, returned from the organization to be checked, is received, receiving an updated business data to be uploaded sent from the organization to be checked, and executing the step of respectively checking whether or not the business data to be uploaded from the plurality of organizations are of data integrity, wherein the organization to be checked is any one of the plurality of organizations sending the business data to be uploaded.

6. The data transmission terminal device of claim 5, wherein, the following steps are further realized when the computer readable instruction is executed by the processor:

receiving login requests sent from a plurality of organizations, wherein the login requests carry identifiers of the organizations respectively;

searching whether or not the identifiers carried in the login requests sent from the plurality of organizations present in pre-stored organization identifiers;

executing the step of acquiring the business data to be uploaded sent from the plurality of organizations when the identifiers of the plurality of organizations are searched out in the pre-stored organization identifiers;

refusing login of an organization to login when it is searched out that an identifier of the organization to login does not present in the pre-stored organization identifiers, and sending login failure information to the organization to login, wherein the organization to login is any one of the plurality of organizations sending the login requests.

7. The data transmission terminal device of claim 5, wherein, the following steps are further realized when the computer readable instruction is executed by the processor:

receiving a data uploading result returned from the system;

sending, to the organizations whose data being determined to be of data integrity in the plurality of organizations, information that the data are successfully uploaded when the data uploading result is that the data uploading succeeds; and re-executing the step of uploading, to the system, the business data to be uploaded from the organizations whose data being determined to be of data integrity in the plurality of organizations in accordance with the grouping result of the second grouping when the data uploading result is that the data uploading fails.

8. The data transmission terminal device of claim 5, wherein, the step of respectively checking whether or not the business data to be uploaded from each of the organizations are of data integrity comprises:

respectively checking whether or not the business data to be uploaded from the plurality of organizations carry preset keywords, and respectively checking whether or not formats of the business data to be uploaded from the plurality of organizations satisfy preset format requirements.

9. A non-transitory computer readable storage medium, the computer readable storage medium storing a computer readable instruction, wherein the following steps are realized when the computer readable instruction is executed by at least one processor:

acquiring business data to be uploaded which are sent from a plurality of organizations;

respectively checking whether or not the business data to be uploaded from each of the organizations are of data integrity;

acquiring business identifiers carried in the business data to be uploaded from organizations whose data being determined to be of data integrity in the plurality of organizations;

performing first grouping on the business data to be uploaded from the organizations whose data being determined to be of data integrity in the plurality of organizations, in accordance with the acquired business identifiers of the organizations whose data being determined to be of data integrity in the plurality of organizations;

determining data size of the business data to be uploaded from the organizations whose data being determined to be of data integrity in the plurality of organizations;

acquiring a data size of each group after the first grouping, in accordance with the determined data size of the business data to be uploaded from the organizations whose data being determined to be of data integrity in the plurality of organizations;

performing second grouping on a grouping result of the first grouping, in accordance with the data size of each group after the first grouping and a preset set of data transmission size;

uploading the business data to be uploaded from the organizations whose data being determined to be of data integrity in the plurality of organizations, in accordance with a grouping result of the second grouping;

sending a prompt whether or not the business data to be uploaded are correct to the plurality of organizations;

executing the step of respectively checking whether or not the business data to be uploaded from the plurality of organizations are of data integrity when information that the business data to be uploaded are confirmed to be correct, returned from the plurality of organizations, is received; and sending a request for acquiring business data to an organization to be checked when information that the business data to be uploaded are confirmed to be wrong, returned from the organization to be checked, is received, receiving an updated business data to be uploaded sent from the organization to be checked, and executing the step of respectively checking whether or not the business data to be uploaded from the plurality of organizations are of data integrity, wherein the organization to be checked is any one of the plurality of organizations sending the business data to be uploaded.

10. The non-transitory computer readable storage medium of claim 9, wherein, the following steps are further realized when the computer readable instruction is executed by the at least one processor:

receiving login requests sent from a plurality of organizations, wherein the login requests carry identifiers of the organizations respectively;

searching whether or not the identifiers carried in the login requests sent from the plurality of organizations present in pre-stored organization identifiers;

executing the step of acquiring the business data to be uploaded sent from the plurality of organizations when the identifiers of the plurality of organizations are searched out in the pre-stored organization identifiers;

refusing login of an organization to login when it is searched out that an identifier of the organization to login does not present in the pre-stored organization identifiers, and sending login failure information to the organization to login, wherein the organization to login is any one of the plurality of organizations sending the login requests.

11. The non-transitory computer readable storage medium of claim 9, wherein, the following steps are further realized when the computer readable instruction is executed by the at least one processor:

receiving a data uploading result returned from the system;

sending, to the organizations whose data being determined to be of data integrity in the plurality of organizations, information that the data are successfully uploaded when the data uploading result is that the data uploading succeeds; and re-executing the step of uploading, to the system, the business data to be uploaded from the organizations whose data being determined to be of data integrity in the plurality of organizations in accordance with the grouping result of the second grouping when the data uploading result is that the data uploading fails.

12. The non-transitory computer readable storage medium of claim 9, wherein, the step of respectively checking whether or not the business data to be uploaded from each of the organizations are of data integrity comprises:

respectively checking whether or not the business data to be uploaded from the plurality of organizations carry preset keywords, and respectively checking whether or not formats of the business data to be uploaded from the plurality of organizations satisfy preset format requirements.

* * * * *